United States Patent [19]

Schaeffer et al.

[11] 3,737,151
[45] June 5, 1973

[54] INJECTION PRESS

[75] Inventors: Gerard Schaeffer, Ambilly, France; Jean Trub, GD-Lancy, GE; Jean Bouvet, Carouge, GE; Andre Kohler, Delemont, all of Switzerland

[73] Assignee: Battelle Memorial Institute, Carouge/Genere, Switzerland

[22] Filed: Feb. 24, 1972

[21] Appl. No.: 228,970

[30] Foreign Application Priority Data

Mar. 5, 1971 Switzerland..........................3208/71

[52] U.S. Cl.....................................259/191, 259/5
[51] Int. Cl...................................B01f 7/08
[58] Field of Search......................259/191, 192, 193, 259/5, 21, 40; 425/203, 209, 200

[56] References Cited

UNITED STATES PATENTS

| | | | |
|---|---|---|---|
| 3,221,369 | 12/1965 | Vesilind | 259/191 |
| 3,317,962 | 5/1967 | Morse | 259/191 |
| 3,319,299 | 5/1967 | Kiraly | 259/191 |
| 3,431,599 | 3/1969 | Fogelberg | 259/191 |
| 3,693,946 | 9/1972 | Merritt | 259/5 |

*Primary Examiner*—Robert W. Jenkins
*Attorney*—Robert E. Burns et al.

[57] ABSTRACT

In an injection press for thermoplastic material of the type having a heated cylinder containing a feed screw rotatably and axially movably mounted in the cylinder for mixing, pressurizing and feeding the thermoplastic material from a feed hopper to a mould at the opposite end of the feed screw, a restriction at the cylinder end adjacent the mould, the end of the feed screw adjacent the restriction having a shape complementary to the restricted end of the cylinder, the improvement comprising a back pressure adjusting device arranged between a first longitudinal zone of the feed screw for introduction and plasticization of the thermoplastic material and a second zone for degassing the thermoplastic material by means of a degassing opening, and a device for adjusting the axial movement of the feed screw during the plasticization and compression of the thermoplastic material as a function of the pressure in the cylinder zone between its restricted end and the end of the feed screw.

3 Claims, 3 Drawing Figures

INJECTION PRESS

This invention relates to an injection press for moulding thermoplastic material of the type comprising a heating cylinder containing a feed screw for mixing and pressurizing the plastics material, one end of the feed screw being connected to a device for supplying the plastics raw material to be mixed, for example, a feed hopper, while the other end of the feed screw is adapted to be brought periodically into contact with a mould in which the parts to be produced by injection moulding are formed by subjecting the plastics material injected into the mould to pressure.

As is known, the feed screw in these presses does not only rotate about its own axis but is also moved axially within the cylinder by a control ram. In fact, usually two strokes are carried out in each working cycle in such a press, namely:

A first stroke in which the feed screw carries out simultaneously a rotating movement, to plasticize and pressurize the plastics material to be injected, and an axial return movement relative to the outlet end of the cylinder connected to the mould to form by this axial movement at this outlet end a cavity (injection pot) which is gradually filled with the pressurized plastics material, the extent of axial movement of the feed screw being determined only by the amount of plastics material to be injected in each working cycle.

A second stroke in which the plastics material is only injected into the mould by an axial movement of the feed screw in the cylinder toward the outlet end of the latter.

This type of press usually has a valve arranged at the downstream end of the feed screw and designed to prevent the plastics material from moving upwardly in the cylinder along the feed screw and enter the feed hopper. However, this valve is never completely tight and the machines which are equipped therewith still have the defect that some of the plastics material flows to the upstream end of the feed screw and this upstream flow of the plastics material would certainly be much less if there was no valve.

It has also been proposed to equip injection presses of this type with a degassing channel opening about in the center of the length of the cylinder and designed to ensure essentially the removal of gas from the plastics material before it is subjected to pressure in the cylinder.

However, the simultaneous provision of a degassing channel and a valve which does not close completely tightly, as described above, results in unstable operating conditions of the press, particularly the amount of material fed by the screw in the cylinder portions upstream and downstream, respectively, of the degassing channel is not in a properly fixed relation to the amount of material to be injected in each working cycle, on the one hand, and to the amount of plastics material that may pass through the valve to the upstream end of the feed screw during the injection stroke, on the other hand, and consequently a certain amount of plastics material is periodically lost through the degassing channel.

It is the object of the present invention to eliminate these disadvantages. For this purpose the invention provides an injection press for thermoplastic material having a cylinder provided at the injection end with a restriction communicating with an injection nozzle, an endless feed screw mounted in the cylinder and having at the injection end a shape complementary to that of the restricted end of the cylinder and having a diameter varying so as to define together with the cylinder successively a first zone for introduction and plasticization of the thermoplastic material, a second zone for degassing the thermoplastic material, and a third zone for compressing the thermoplastic material, the cylinder being provided with a latter feed opening in the first zone and with a lateral degassing opening in the second zone, a non-return valve arranged at the downstream end of the third zone, cylinder heating means, and means for imparting to the feed screw an angular movement and an axial movement.

The press according to the invention is characterized in that it comprises a back pressure adjusting device arranged between the first and second zones and a device for adjusting the axial movement of the feed screw during plasticization and compression of the thermoplastic material as a function of the pressure in the cylinder zone between its restricted end and the end of the feed screw.

A preferred embodiment of the invention will now be described by way of example and with reference to the accompanying drawings, in which.

Figure 1:
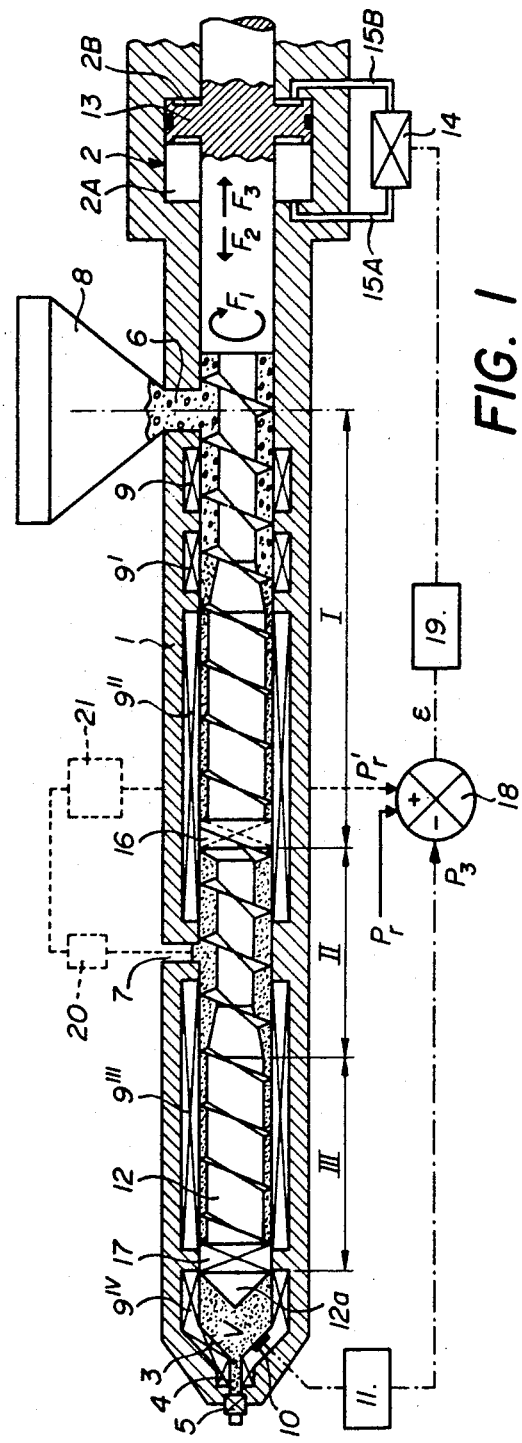
FIG. 1 is a longitudinal section through an injection press according to the present invention.

The injection press shown in FIG. 1, as the conventional presses of this type, comprises a cylinder 1 whose right end, as seen in the drawing, has a portion of larger diameter accommodating a cylindrical chamber 2 whereas the left end is provided with a restricted portion 3 pierced by an injection nozzle 4 controlled by a valve 5 provided with means for fixing the pressure value at which it will open and which corresponds to the pressure value for initiating the injection operation. The plastics material to be injected into a mould, not shown, is forced into and through the injection nozzle 4.

The peripheral wall of the cylinder 1 substantially has tyo openings 6 and 7. The first opening 6 serves for connection of the cylinder to a feed hopper 8. The second opening 7 essentially serves to permit the gas and vapors contained in the plastics material mixed in the cylinder to escape.

The cylinder 1 is heated to a temperature in the order of 150° to 400°C. by a plurality of heating bodies arranged along the length of the cylinder between the feed hopper 8 and the injection nozzle 4. These heating bodies are schematically indicated in the drawing by rectangles 9, 9', 9'', 9''' and 9''''. they may be in the form of a heating coil in which superheated steam flows or they may be electric resistors appropriately fed by electric power.

Further, in the portion of the cylinder 1 adjacent the restricted end 3 the cylinder is provided with a sensing device 10, for example a pressure feeler, which communicates to a pressure detector 11 the pressure values prevailing in the space V of the cylinder which formas an injection pot.

A feed screw 12 is rotatably mounted in the interior of the cylinder 1 and is driven with a rotary movement about its longitudinal axis in the direction of rotation indicated by the arrow $F_1$ by a motor, not shown, and receives an axial movement either in a direction $F_2$, by the action of a piston 13 mounted with its periphery tightly engaging the interior of the chamber 2 and thus dividing this chamber into two portions 2A and 2B, or in a direction $f_3$, opposed to the direction $F_2$, by the combined action of the piston 13 and the pressure prevailing in the space V.

The chamber portions 2A and 2B are connected to source of pressure fluid 14, for example, a source of oil under pressure, the first chamber portion 2A through a conduit 15A and the second chamber portion 2B through a conduit 15B.

The means for axial movement of the screw 12 is also arranged that when oil is supplied under pressure from the pressure fluid source 14 through the conduit 15A to the chamber portion 2A, the conduit 15B serves as a discharge conduit for the oil contained in the chamber portion 2B. In the same way, when oil is supplied from the pressure fluid source 14 through the conduit 15B to the chamber portion 2B, the chamber portion 2A is free to be discharged and the screw 12 is free to move in the direction $F_2$.

Thus the screw 12 may occupy two axial end positions, i.e. one end position in which the screw 12 is located at the extreme right end as shown in FIG. 1 and in which the space forming the injection pot V between the adjacent screw end and the left end of the cylinder 1 has its largest volume, and another end position in which the end 12a of the screw 12 forms the injection head which has a shape complementary to that of the restricted end 3 of the cylinder 1, in the illustrated embodiment a conical shape, and practically engages the end 3 of the cylinder 1.

In the illustrated embodiment of the injection press the diameter of the screw 12 varies to define with the cylinder 1 three main zones, i.e.:

A first zone I intended for feeding the press with the plastics material to be injected and for plasticizing the plastics material.

A second zone II in which the plasticized material is degassed.

A third zone III in which the plastics material mixed and degassed in the zones I and II, respectively, is compressed.

Further, two devices 16 and 17 are mounted in the screw 12, the device 16 being arranged at the downstream end of the zone I of the screw and the device 17 being arranged at the downstream end of the zone III of the screw.

The device 16 is designed to permit adjustment of the back pressure in that portion of the zone I in which the material is plasticized. This device may be, for example, of the type currently utilized in extruders and described in U.S. Pat. No. 2,970,341 or German Pat. No. 1,197,611.

The device 17 is formed by a valve designed to permit flow of plastics material in the cylinder 1 from right to left in the drawing toward the space V and to prevent such flow in the opposite direction. However, because of the particularly high pressure prevailing the space V during the injection operation the valve 17 is not capable of ensuring complete tightness and allows an amount R of plastics material to pass toward the opening 7, this amount being a direct function of the pressure in the space V and of the duration of the injection operation.

In an injection press the total amount of plastics material moving upstream along the feed screw in each injection cycle is, however, higher than the value R by a value R' which is essentially the result of the natural tendency of any paste, conveyed under pressure by a screw in a cylinder, to move upstream along the screw, this value R' being really very small in relation to the amount of material leaving the cylinder.

When therefore the described injection press is to operate without having plastics material flowing out through the degassing opening 7, the amounts $Q_1$ and $Q_2$ of plastics material fed respectively by the screw 12 in the zones I and III should correspond to the following relation:
$$Q_3 \cdot t = Q_1 \cdot t + (R + R')$$
in which t represents the duration of the first one of the two strokes of a working cycle of the injection press.

For a given setting of the device 16 and for a predetermined profile of the feed screw in the zone I, the value $Q_1$ and the pressure $P_1$ of the plastics material fed in the zone I follow a well defined law. Also the values R and R' are practically constant and essentially only depend on the characteristics of the valve 17 and those of the feed screw in the zone III.

As the value $Q_1$ and the values R and R' are determined by the characteristics of the machine and by those of the plastics material treated by the machine, the problem to be solved is only that of adjusting the value $Q_3$ so as to meet the said relation.

For this purpose, first of all it must be determined how the feed screw 12 should be designed to achieve this object and to ensure that the press will work satisfactorily.

As pointed out above, the purpose of the zone I is to ensure melting, plasticization and homogenization of the plastics material distributed in the cylinder 1 downstream of the feed hopper 8.

As is known, plasticization and homogenization and subsequent degassing of the plastics material very largely depend on the degree of shearing stress to which the plastics material is subjected. The degree of shearing stress is a function of the ratio $dQ_1/dP_1$ and of the height of the pressure $P_1$ in the downstream portion of the zone I. It has been found that the degree of shearing stress is particularly favorable when the said ratio is small.

Figure 3:
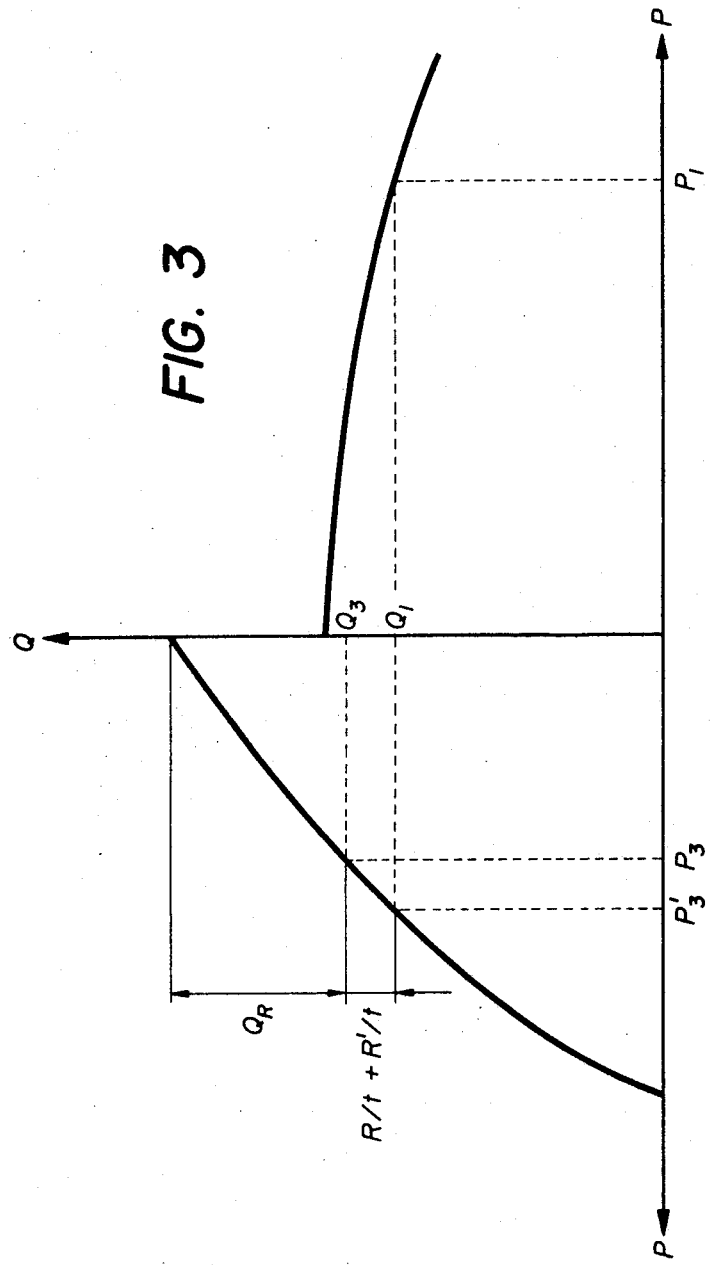
FIG. 3 shows diagrams illustrating the relation between the pressure and the amount of plastics material fed in two different zones of the feed screw of the press.

In the illustrated embodiment of the injection press, the depth of the screw thread in the zone I, the pitch length of the screw thread, the extent of the play between the periphery of the screw thread and the inner peripheral wall of the cylinder 1 as well as the length of the zone I are selected in such a manner that the characteristic diagram representing the ratio between pressure $P_1$ and amount of flow $Q_1$ in the zone I has a particularly flat form as shown in FIG. 3. In this case the tangent value $dQ_1/dP_1$ is necessarily small.

Figure 2:
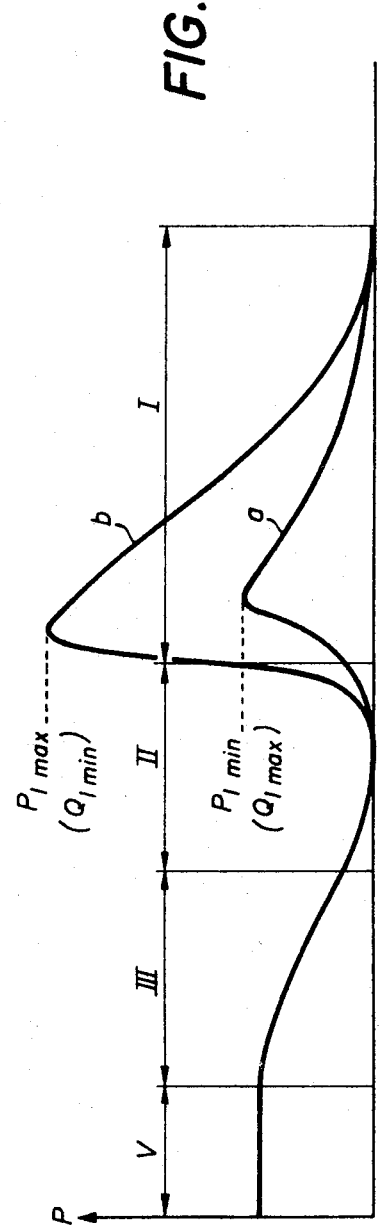
FIG. 2 is a diagram showing the development of pressure in the interior of the press cylinder at different points along its length.

Thus, for each value of the pressure $P_1$, which can be appropriately adjusted by the device 16, the zone I supplies a predetermined amount of flow $Q_1$ of plastics material. FIG. 2 shows more particularly the variation of the pressure $P_1$ along the zone I in two exstreme cases, i.e., a first case in which the amount of flow $Q_1$ is highest (curve a), and a second case in which the amount of flow $Q_1$ is lowest (curve $b$), these two cases corresponding respectively to a pressure $p_1$ of the lowest value at the level of the device 16 and a pressure $P_1$ of the highest value at the level of the device 16.

In the zone II the feed screw 12 is constructed in the same way as the corresponding portion of the feed screw in an extruder with degassing device and the pressure in the plastics material in the zone II is small due to the evacuation therefrom of the gases and vapors.

The amount of flow in the zone II depends mainly on the amount of flow $Q_3$ in the zone III. Consequently, if the amount of flow $Q_3$ were smaller than the amount of flow $Q_1$ in the zone I, the plastics material would be forced out through the degassing opening 7 and this plastics material would be lost and in addition no efficient degassing could be obtained.

The profile of the feed screw 12 in the zone III is very different from that in the zone I as the main purpose of the zone III is not that of plasticizing and homogenizing but of compressing the plastics material. Therefore, the profile of the feed screw 12 in the zone III is so selected that the characteristic diagram representing the ratio between amount of flow $Q_3$ and pressure $P_3$ in the zone III is a curve of a much greater inclination than that of the curve representing the characteristic $Q_1 - p_1$. Thus, the ratio $dQ_3/dP_3$ will be much higher at any point of the characteristic and any variation, however small, of the pressure $P_3$ in the zone III, particularly in the downstream portion of this zone, will produce a heavy variation of the amount of flow $Q_3$ (FIG. 3). Due to this particular construction of the zone III it will therefore be possible to obtain a relatively easy adjustment of the amount of flow $Q_3$ in the zone III by merely changing the value of the pressure $P_3$ in the portion downstream of this zone as well as in the space V delimited by the left end of the cylinder 1, on the one hand, and by the screw 12, on the other.

To ensure that in the described injection press no plastics material is discharged through the degassing opening 7 it is indispensable for the amounts of flow $Q_1$ and $Q_3$ delivered by the zones I and III, respectively, to have the aforementioned relation:

$$Q_3 \cdot t = Q_1 \cdot t + (R + R')$$

In consideration of the particular form of the characteristic diagram $Q_1 - P_3$ this practically necessitates operation of the press with a pressure $P_3$ lower than the pressure $P'_3$ (FIG. 3) which would have to be applied if there was no return flow of plastics material toward the interior of the injection press, as described above, which return flow in each working cycle would cause an amount of plastics material $R + R'$ to be transferred to the zone II (FIG. 3), as previously described.

In the diagram of FIG. 3 the increase in the amount of flow resulting from this return flow resulting from this return flow corresponds to the difference between the pressure $P'_3$ and $P_3$ and is equal to $R + R'$ divided by the duration of the first stroke in the working cycle of the press and the zone III must be capable of absorbing this increase.

Therefore, to ensure that the described injection press will work correctly without discharging plastics material through the degassing opening 7 it is indispensable to maintain the pressure in the space V at the aforementioned value $P_3$ for the entire duration of filling this space with the plastics material supplied under pressure by the feed screw 12. As the volume of this space V is increasing in proportion to the feeding of plastics material by the screw 12 due to movement of the latter in the direction $F_3$, the problem essentially consists in ensuring that this movement is carried out at a speed such that the pressure in the interior of the space V remains permanently equal to the chosen value of $P_3$.

This problem is solved according to the invention by completing the described press by making the speed of axial movement of the feed screw 12 in the direction $F_3$ dependent on the variations in pressure detected by the sensing device 10 in the space V.

For this purpose the pressure detector 11 has its outlet connected to one of the inlets of a comparator 18 which through its other inlet permanently receives a control signal corresponding to a reference pressure $P_r$ which in this case has the desired value for the pressure $P_3$. The signal $\epsilon$ resulting from this comparison is supplied to a regulator 19 which controls the means for axial movement of the feed screw 12 formed by the source of pressure fluid 14, the conduits 15A and 15B, the piston 13 and the two chamber portions 2A and 2B delimited by the piston 13 in the chamber 2. According to the nature or sign and the value of the signal $\epsilon$ these means drive the feed screw 12 during the preparation of the plastics material (the first stroke) in the required direction and at the required speed to ensure that the pressure $P_3$ is maintained at the value of the pressure $P_r$.

With the described regulating means the speed of axial movement of the feed screw 12 in the direction $F_3$ can thus be very accurately controlled even while the feed screw is rotating about its own axis so that its speed of axial movement will remain constant as long as the pressure in the space V remains equal to the desired value $P_3$, this speed being increased or reduced, respectively, in a manner corresponding to any increase or reduction of the pressure actually detected in the space V by the sensing device 10.

The power required to move the feed screw in the direction $F_3$ is not supplied only by the pressure exerted on the piston 13 by the fluid in the chamber portion 2A but is also derived in part from the pressure $P_3$ in the space V at the left end of the feed screw 12. For certain values of the pressure $P_3$, the pressure exerted by the plastics material on the feed screw may be higher than the pressure exerted on the piston 13 by the pressure fluid in the chamber portion 2A.

The described regulating means permit the axial movement of the feed screw 12 to be finely and accurately controlled by the alternate action of the pressure fluid on the right-hand or left-hand face of the piston 13, depending upon whether the feed screw 12 is to be moved faster in the direction $F_3$ or slower, i.e., is to be moved temporarily in the direction $F_2$ opposed $F_3$.

As pointed out above, the height of the pressure $P_3$ which must be available in the space V to ensure that the amounts of flow $Q_1$ and $Q_3$ are such as to avoid discharge of plastics material through the degassing opening 7, to a very large extent depends on the physical properties of the plastics material being worked and must therefore be selected individually for each case. This selection may be made on the basis of a visual inspection of the level of plastics material in the degassing opening 7 and by a corresponding adjustment of the control value $P_r$ of the comparator 18.

According to a further improvement of the described embodiment of the injection press this adjustment may also be carried out completely automatically by having this control value in turn controlled by the level of plastics material in the degassing opening 7, this level being then checked by an appropriate optical or electronic monitoring device.

Such automatic control means are illustrated in dash lines in FIG. 1. A detector 20 for ascertaining the level of plastics material in the degassing opening 7 is connected to the inlet of a signal generator 21 producing signals corresponding to different levels of the plastics material in the degassing opening 7. The signals delivered by the signal generator 21 are transmitted to the comparator 18 an thus represent the value of the reference pressure $P'_r$.

Obviously the invention is not limited to the described and illustrated embodiment. In particular, the back pressure adjusting device 16 at the downstream end of the zone I of the feed screw 12 may be mounted on the cylinder 1 instead of the feed screw 12. Also the means for feeding the plastics material to be worked to the injection press may be different from the feed hopper 8 which has been recited only by way of example.

We claim:

1. In an injection press for thermoplastic material having a cylinder provided at the injection end with a restriction communicating with an injection nozzle, and endless feed screw mounted in the cylinder and having at the injection end a shape complementary to that of the restricted end of the cylinder and having a diameter varying so as to define together with the cylinder successively a first zone for introduction and plasticization of the thermoplastic material, a second zone for degassing the thermoplastic material, and a third zone for compressing the thermoplastic material, the cylinder being provided with a lateral feed opening in the first zone and with a lateral degassing opening in the second zone, a non-return valve arranged at the downstream end of the third zone, cylinder heating means, and means for imparting to the feed screw an angular movement and an axial movement, the improvement comprising a back pressure adjusting device arranged between the first and second zones and a device for adjusting the axial movement of the feed screw during the plasticization and compression of the thermoplastic material as a function of the pressure in the cylinder zone between its restricted end and the end of the feed screw.

2. An injection press as claimed in claim 1, wherein the device for adjusting the axial movement of the feed screw comprises a pressure detector arranged in the zone between the restricted cylinder end and the screw end, a comparator for comparing the pressure detected by the detector with a reference pressure corresponding to the pressure desired to be maintained in said zone, said comparator being arranged to provide a signal indicative of the difference between the two compared pressures, and a regulator controlled by said signal to act upon said means for axial movement of the feed screw so as to move the latter in the direction and at the speed required to maintain the pressure in said zone at the level of the reference pressure.

3. An injection press as claimed in claim 2, further comprising control means for adjusting said reference pressure as a function of the level of thermoplastic material in said degassing opening, said control means including a detector mounted on said degassing opening to detect the level of thermoplastic material in the degassing opening and a signal generator having its inlet connected to said detector to provide signals indicative of said level, the outlet of said signal generator being connected to the inlet of said comparator.

* * * * *